United States Patent
Kim et al.

(10) Patent No.: US 9,883,335 B2
(45) Date of Patent: Jan. 30, 2018

(54) HANDHELD DEVICE AND METHOD FOR MEASURING QUALITY OF OPTICAL LINK

(71) Applicant: Electronics and Telecommunications Research Institute, Daejeon (KR)

(72) Inventors: Sung-Chang Kim, Gwangju (KR); Geun-Yong Kim, Gwangju (KR); Jae-In Kim, Gwangju (KR); Hark Yoo, Gwangju (KR); Dong-Soo Lee, Gyeonggi-Do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 183 days.

(21) Appl. No.: 15/006,530

(22) Filed: Jan. 26, 2016

(65) Prior Publication Data

US 2016/0344475 A1   Nov. 24, 2016

(30) Foreign Application Priority Data

May 19, 2015 (KR) ........................ 10-2015-0069408

(51) Int. Cl.
*H04B 17/00* (2015.01)
*H04W 4/02* (2009.01)

(52) U.S. Cl.
CPC ..................... *H04W 4/02* (2013.01)

(58) Field of Classification Search
CPC ...................................................... H04W 4/02
See application file for complete search history.

(56) References Cited

U.S. PATENT DOCUMENTS

| | | | |
|---|---|---|---|
| 2003/0112433 A1 | 6/2003 | Youn et al. | |
| 2008/0292314 A1* | 11/2008 | Lu | H04B 10/0773 398/58 |
| 2011/0236017 A1* | 9/2011 | Ohlen | H04J 14/0282 398/34 |
| 2012/0127458 A1 | 5/2012 | Lim et al. | |
| 2013/0251362 A1* | 9/2013 | Li | H04B 10/0795 398/25 |
| 2014/0016926 A1* | 1/2014 | Soto | H04B 10/0775 398/16 |

FOREIGN PATENT DOCUMENTS

| | | |
|---|---|---|
| KR | 10-2012-0030397 A | 3/2012 |
| KR | 10-2012-0117353 A | 10/2012 |
| KR | 10-1464928 B1 | 11/2014 |
| WO | 2010/126427 A1 | 11/2010 |

* cited by examiner

*Primary Examiner* — Tesfaldet Bocure
(74) *Attorney, Agent, or Firm* — Nelson Mullins Riley & Scarborough LLP; Anthony A. Laurentano

(57) ABSTRACT

Disclosed herein are a handheld device and method for measuring the quality of an optical link, which are capable of simultaneously measuring the strength of an optical signal and the quality of an optical link at an optical network terminal in a Fiber-to-the-Home (FTTH) network. A presented handheld device for measuring a quality of an optical link includes an optical signal input port for receiving an optical signal, an optical power measurement unit for measuring a power of the optical signal, an output unit for outputting one or more of a measured power value of the optical signal and results of quality measurement of an optical link, based on interworking with an optical network terminal, and a control unit for storing the measured power value of the optical signal and performing a process for quality measurement of the optical link.

20 Claims, 8 Drawing Sheets

HANDHELD DEVICE AND METHOD FOR MEASURING QUALITY OF OPTICAL LINK

CROSS REFERENCE TO RELATED APPLICATION

This application claims the benefit of Korean Patent Application No. 10-2015-0069408, filed May 19, 2015, which is hereby incorporated by reference in its entirety into this application.

BACKGROUND OF THE INVENTION

1. Technical Field

The present invention generally relates to a handheld device and method for measuring the quality of an optical link and, more particularly, to a device and method for measuring the power and service quality of an optical link in a Passive Optical Network (PON) and an Active Optical Network (AON), which are parts of Fiber-to-the-Home (FTTH) technology.

2. Description of the Related Art

Recently, due to the explosive increase in mobile data traffic, attempts to realize broadband, long-distance, highly integrated wired/wireless networks have been actively made.

In particular, in a wired optical network field, 1G Ethernet-PON (E-PON) and 2.5G Gigabit-PON (G-PON) technologies have been commercialized and propagated to individual homes.

Further, it is expected that 10G E-PON technology and 10 Gigabit-PON (XG-PON) technology will be completely standardized and commercialized in the near future.

In this way, as optical network technology has been realized as broadband technology, existing copper wire-based subscriber network infrastructure is expected to be rapidly replaced with optical-based network infrastructure.

To provide fast and reliable service in the ever-expanding optical-based network infrastructure, the strengthening of network management functions is critically required. In particular, an optical power meter for checking the presence or absence of signals in an optical line (optical link) and the strength of the signals is a portable measuring instrument that must be carried by an engineer when a new subscriber subscribes to service or when the engineer travels to the site of an incident based on a trouble report.

In a current process related to the case where a new subscriber subscribes to Internet service, an engineer first travels to the worksite and measures the signal strength of an optical link using an optical power meter. If the measured signal is strong enough to support communication, the engineer connects a desktop Personal Computer (PC) or a notebook computer to an Optical Network Terminal (ONT), which is a modem device for a subscriber, and then measures Internet service quality.

Generally, the term "Internet service quality" refers to upstream/downstream bandwidth and service latency, but may include jitter or other performance indices. The resultant measured optical link quality values may be directly shown to the subscriber at the installation site, or may be reported to the subscriber via email or Short Message Service (SMS). Further, quality measurement data is stored in the subscriber management server of the network service provider, and then the provision of service is completed.

As described above, to provide Internet service, there is an inconvenience in that an engineer must carry two types of devices, namely the optical power meter and the notebook computer. In addition, from the standpoint of the communication service provider, a problem may arise in that notebook computers must be provided to all engineers merely to perform an optical link quality test, thus increasing the economic burden.

Another current problem arises in that it is difficult to guarantee the reliability of measurement data when the quality of an optical link is periodically inspected. The reason for this is that an engineer is forced to travel to the worksite, measure the quality of the optical link, and manually enter the measurement results. The current operation and management system for causing the engineer to manually enter resultant values in this way is problematic in that it is difficult to determine, using only the system, whether the engineer has personally performed the measurement and entered the resultant data, or whether the engineer entered false data without actually travelling to the worksite.

As preceding technologies related to the present invention, there are disclosed Korean Patent Application Publication No. 2012-0117353 (entitled "One Body Type Optical Power Meter Having Fault Position Finder"), and Korean Patent Application Publication No. 2012-0030397 (entitled "Method and Apparatus for Fault Discovery in a Passive Optical Network (PON)").

SUMMARY OF THE INVENTION

Accordingly, the present invention has been made keeping in mind the above problems occurring in the prior art, and an object of the present invention is to provide a handheld device and method for measuring the quality of an optical link, which are capable of simultaneously measuring the strength of an optical signal and the quality of an optical link at an optical network terminal in a Fiber-to-the-Home (FTTH) network.

In accordance with an aspect of the present invention to accomplish the above object, there is provided a handheld device for measuring a quality of an optical link, including an optical signal input port for receiving an optical signal; an optical power measurement unit for measuring a power of the optical signal; an output unit for outputting one or more of a measured power value of the optical signal and results of quality measurement of an optical link, based on interworking with an optical network terminal; and a control unit for storing the measured power value of the optical signal and performing a process for quality measurement of the optical link.

The optical signal input port may be connected to an optical fiber connector of an optical link that is desired to be measured.

The measured power value of the optical signal may include a wavelength and a strength of the corresponding optical signal.

The control unit may be configured to, when the optical network terminal is initialized and the control unit is connected to the optical network terminal, initiate the process for quality measurement of the optical link.

The control unit may obtain resultant values for upstream/downstream bandwidth and latency of the optical link as the results of quality measurement of the optical link.

The handheld device may further include a Global Positioning System (GPS) module unit for acquiring location information of the handheld device for measuring the quality of the optical link, wherein the location information is stored, together with the measured power value of the optical signal and the results of quality measurement of the optical link, in the control unit.

The handheld device may further include a long-range communication unit, wherein the control unit transmits the stored power value of the optical signal and the results of quality management of the optical link to a service subscriber or a quality management server through the long-range communication unit.

The handheld device may further include an optical signal output port for providing the optical signal to the optical network terminal; and a coupler for branching the optical signal, input to the optical signal input port, into the optical power measurement unit and the optical signal output port.

In accordance with an aspect of the present invention to accomplish the above object, there is provided a handheld device for measuring a quality of an optical link, including an optical signal input port for receiving an optical signal; an optical power measurement unit for measuring a power of the optical signal; and a control unit for transmitting a measured power value of the optical signal to a mobile device, and transmitting results of quality measurement of an optical link based on interworking with the optical network terminal to the mobile device.

The control unit may direct an optical connector to be released from the optical signal input port and to be connected to the optical network terminal in compliance with a quality measurement command from the mobile device.

The control unit may be configured to, when the optical connector is connected to the optical network terminal and then the control unit is connected to the optical network terminal, initiate a process for quality measurement of the optical link.

The mobile device may display the power value of the received optical signal and the results of quality measurement of the optical link on a screen.

The mobile device may display location information, together with the power value of the received optical signal and the results of quality measurement of the optical link, on the screen.

The mobile device may transmit the power value of the received optical signal and the results of quality measurement of the optical link to a service subscriber or a quality management server.

In accordance with a further aspect of the present invention to accomplish the above object, there is provided a method for measuring a quality of an optical link, including measuring, by a handheld optical link quality measuring device, a power of an optical signal, via a connection to an optical link that is desired to be measured; measuring, by the handheld optical link quality measuring device, upstream/downstream speed and latency of the optical link, via a connection to an optical network terminal; and analyzing, by the handheld optical link quality measuring device, the upstream/downstream speed and latency of the optical link, thus determining a performance of the optical link.

The method may further include, after determining the performance of the optical link, displaying, by the handheld optical link quality measuring device, the measured power value of the optical signal and the results of quality measurement of the optical link on a screen.

The method may further include, after determining the performance of the optical link, transmitting, by the handheld optical link quality measuring device, the measured power value of the optical signal and the results of quality measurement of the optical link to a service subscriber.

The method may further include, after determining the performance of the optical link, transmitting, by the handheld optical link quality measuring device, the measured power value of the optical signal and the results of quality measurement of the optical link, together with location information, to a management server of a service provider.

BRIEF DESCRIPTION OF THE DRAWINGS

The above and other objects, features and advantages of the present invention will be more clearly understood from the following detailed description taken in conjunction with the accompanying drawings, in which.

Figure 1:
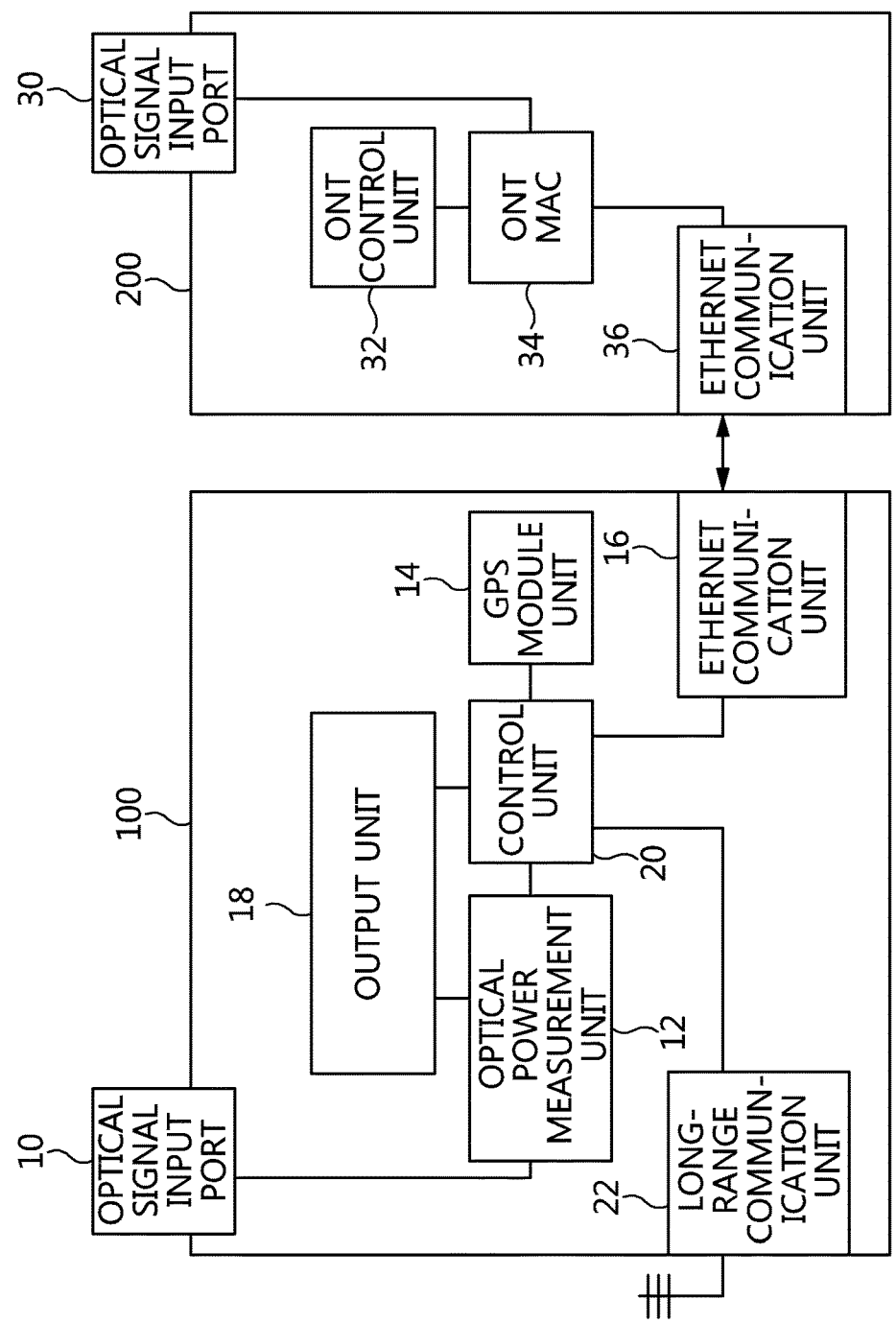
FIG. 1 is a configuration diagram showing a handheld device for measuring the quality of an optical link according to a first embodiment of the present invention.

DESCRIPTION OF THE PREFERRED
EMBODIMENTS

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

The present invention proposes four types of structures for a handheld device for measuring the quality of an optical link: a separated-type optical link quality measuring device structure for supporting long-range communication, an integrated-type optical link quality measuring device for supporting long-range communication, a separated-type optical link quality measuring device structure based on mobile device interworking, and an integrated-type optical link quality measuring device structure based on mobile device interworking, depending on whether the structure interworks with an external mobile device and whether a coupler is used at an optical signal input port. The proposed four structures will be described in detail below with reference to embodiments.

FIG. 1 is a configuration diagram showing a handheld device for measuring the quality of an optical link according to a first embodiment of the present invention. FIG. 1 may be regarded as a diagram for describing the structure of a separated-type optical link quality measuring device for supporting long-range communication.

A handheld device 100 for measuring the quality of an optical link according to a first embodiment of the present invention includes an optical signal input port 10, an optical power measurement unit 12, a Global Positioning System (GPS) module unit 14, an Ethernet communication unit 16, an output unit 18, a control unit 20, and a long-range communication unit 22.

The optical signal input port 10 allows an optical fiber connector to be connected thereto.

The optical power measurement unit 12 may measure the wavelength and strength of an optical signal input through the optical signal input port 10. Here, the wavelength and strength of the optical signal is called 'optical power'.

The GPS module unit 14 may provide the location information of the handheld optical link quality measuring device 100.

The Ethernet communication unit 16 may perform data transmission/reception to/from an Optical Network Terminal (ONT) 200.

The output unit 18 may output the results of quality measurement. For example, the output unit 18 may output the measured wavelength and strength of the optical signal. Further, according to need, the output unit 18 may additionally output resultant upstream/downstream bandwidth and latency values, which are quality measurement values for optical links.

The control unit 20 functions to control the overall operation of the corresponding handheld optical link quality measuring device.

The long-range communication unit 22 is capable of communicating with the management server (not shown) of a service provider located a long distance away.

The operation of the handheld optical link quality measuring device according to the first embodiment of the present invention, configured as described above, includes the stage of measuring the wavelength and strength of an optical signal (hereinafter referred to as a 'first stage') and the stage of measuring the Internet quality of an optical link (hereinafter referred to as a 'second stage').

In the first stage, the optical fiber connector of the optical link that is desired to be measured is inserted into the optical signal input port 10. Further, the optical power measurement unit 12 measures the wavelength and strength of the optical signal received by the optical signal input port 10. The optical power measurement unit 12 transfers the measured data to the control unit 20. Accordingly, the values of the measured data are stored in the control unit 20 while being output as resultant values via the output unit 18. Here, the output unit 18 includes an external display screen such as a Liquid Crystal Display (LCD) or a Light Emitting Diode (LED).

In the second stage, the optical fiber connector inserted into the optical signal input port 10 of the handheld optical link quality measuring device 100 is released from the optical signal input port 10, and is then inserted into the optical signal input port 30 of the ONT 200. Thereafter, an ONT control unit 32 and an ONT Media Access Control (MAC) unit 34 perform an initialization procedure based on the received optical signal. The Ethernet communication unit 36 of the ONT 200, having completed its initialization procedure, is connected to the Ethernet communication unit 16 of the handheld optical link quality measuring device 100 using an Ethernet cable. Thereafter, the control unit 20 of the handheld optical link quality measuring device 100 initiates a process for measuring the bandwidth and latency performance of the optical link. The upstream/downstream bandwidth and latency performance may be measured while an upstream packet and a downstream packet are exchanged with a preset performance measurement server (not shown) in a central office.

The resultant values of the wavelength and strength of the optical signal, which are measured in the above-described first stage, and the upstream/downstream bandwidth and latency, which are the quality values of the optical link measured in the second stage, are stored together with subscriber information and GPS information in the control unit 20 of the handheld optical link quality measuring device 100. The data stored in the control unit 20 may be transmitted to the management server (not shown) of a service provider through the long-range communication unit 22, and may then be stored in a database (DB). In addition to being stored in this way, the resultant values may also be transmitted to the subscriber via SMS or email.

Figure 2:
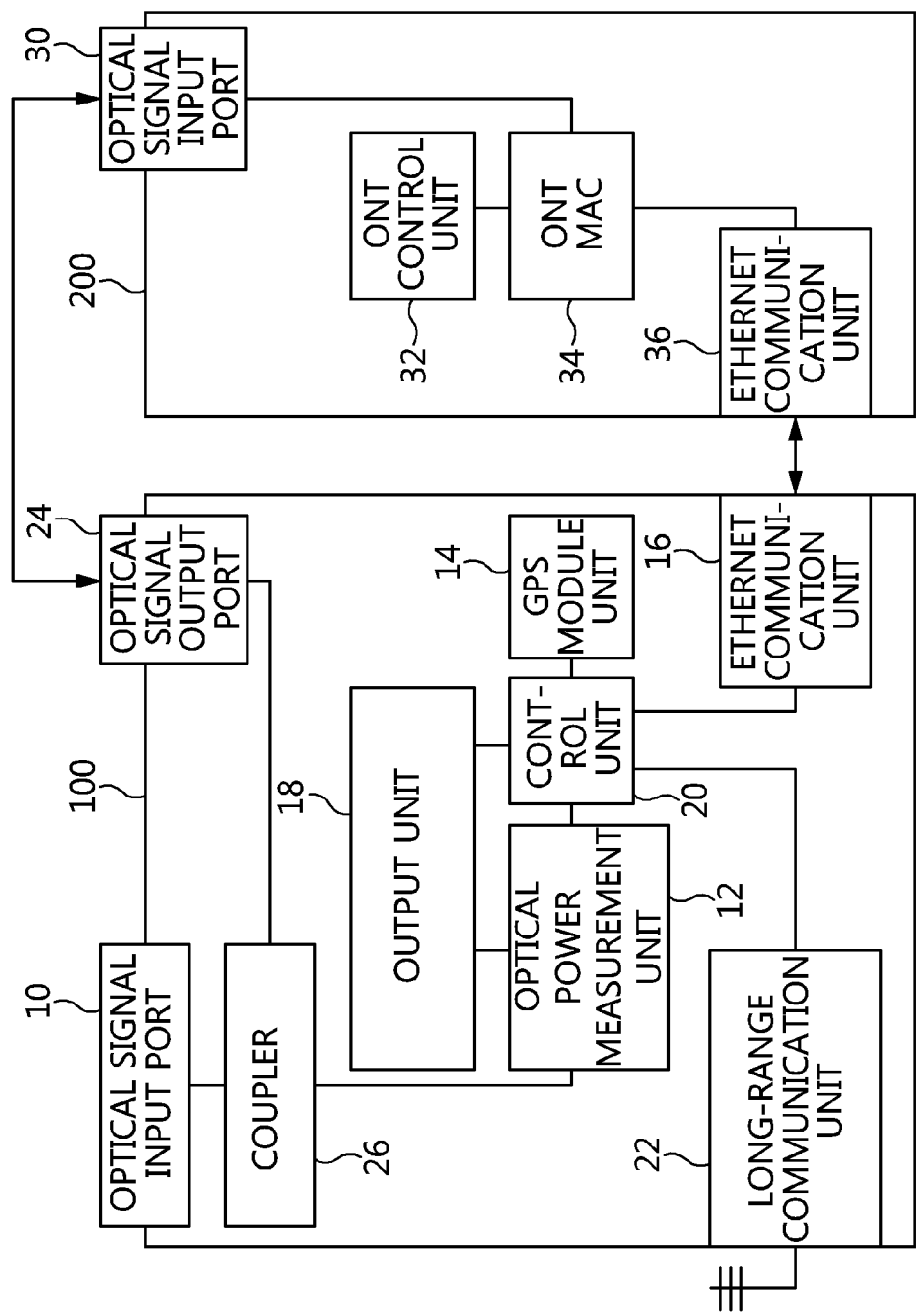
FIG. 2 is a configuration diagram showing a handheld device for measuring the quality of an optical link according to a second embodiment of the present invention.

FIG. 2 is a configuration diagram showing a handheld device for measuring the quality of an optical link according to a second embodiment of the present invention. FIG. 2 may be regarded as a drawing for describing the structure of an integrated-type optical link quality measuring device for supporting long-range communication.

Compared to the above-described handheld optical link quality measuring device 100 according to the first embodiment, a handheld optical link quality measuring device 100 according to the second embodiment of the present invention further includes an optical signal output port 24 and a coupler 26. In FIG. 2, the same reference numerals are used to designate the components having the same functions as those of FIG. 1, and thus a detailed description thereof will be omitted.

The handheld optical link quality measuring device 100 according to the second embodiment of the present invention may overcome the disadvantage of the above-described first embodiment. That is, the measurement procedure in the first embodiment is performed in two stages. However, the handheld optical link quality measuring device 100 according to the second embodiment of the present invention may perform both measurement procedures corresponding to two stages simultaneously.

For this, in the second embodiment of the present invention, an optical signal is branched into two directions using a 1:2 coupler 26. That is, the optical signal received by an optical signal input port 10 is separated into parts for an optical power measurement unit 12 and for the optical signal output port 24 through the coupler 26. In this case, the measuring device is designed such that only a small amount of optical signal (e.g. about 5% or less of the input optical signal) is distributed to the optical power measurement unit 12.

Further, the optical signal output port 24 and the optical signal input port 30 of an Optical Network Terminal (ONT) 20 are connected to each other through an optical fiber connector, thus enabling the optical signal to be applied to the ONT 20.

The handheld optical link quality measuring device 100 according to the second embodiment, configured as described above, may simultaneously perform respective optical link quality measurement procedures, which were performed sequentially in two stages in the first embodiment. In other words, there is an advantage in that the procedure for measuring the wavelength and strength of the optical signal and the procedure for measuring the bandwidth and latency of the optical link may be performed simultaneously. The remaining operating schemes of the second embodiment are identical to those of the first embodiment.

Figure 3:
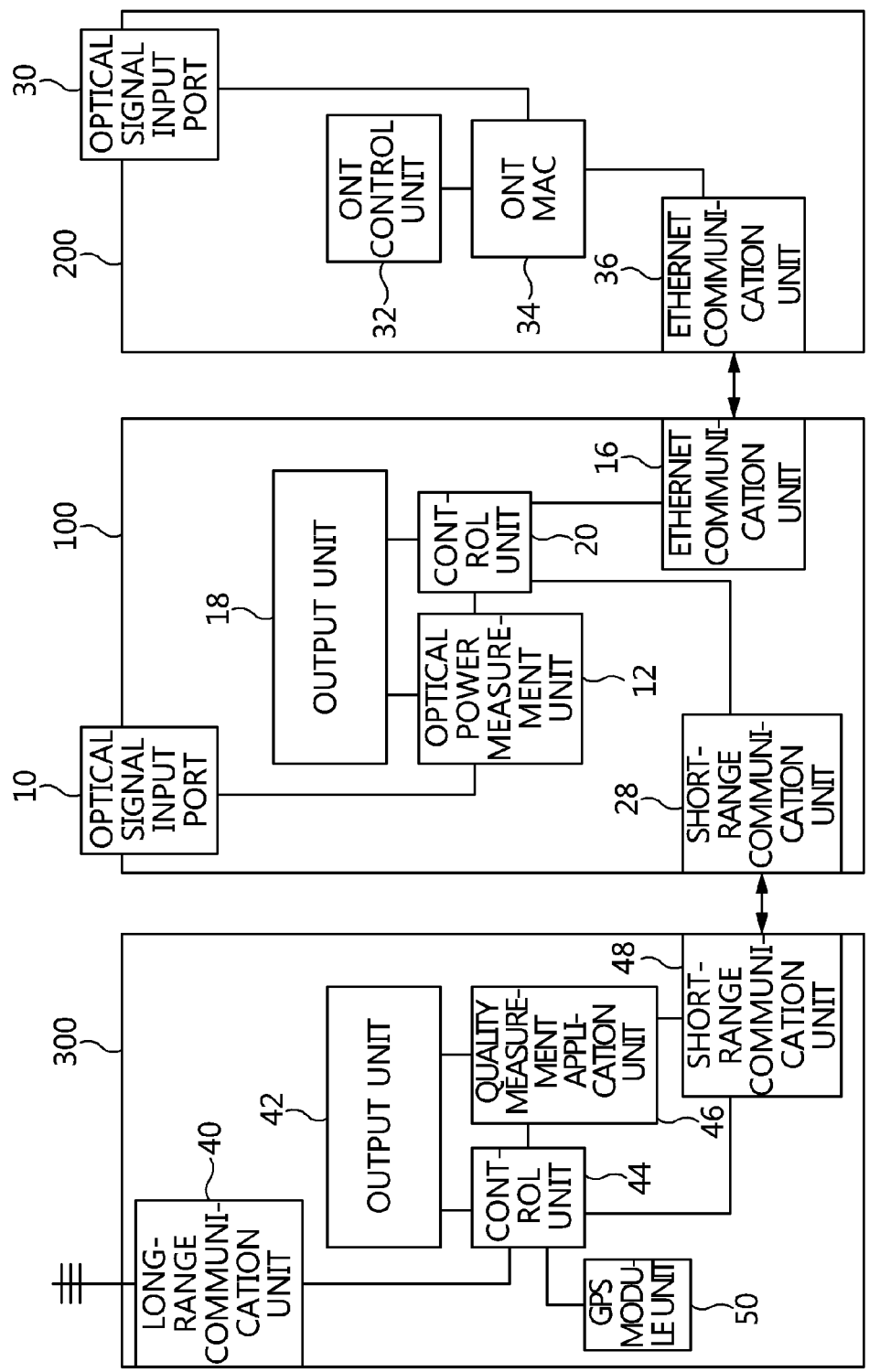
FIG. 3 is a configuration diagram showing a handheld device for measuring the quality of an optical link according to a third embodiment of the present invention.

FIG. 3 is a configuration diagram showing a handheld device for measuring the quality of an optical link according to a third embodiment of the present invention. FIG. 3 may be regarded as a diagram for describing the structure of a separated-type optical link quality measuring device based on mobile device interworking.

The handheld optical link quality measuring device 100 according to the third embodiment of the present invention is different from that of the first embodiment in that a short-range communication unit 28, instead of the long-range communication unit of FIG. 1, is used, and in that a GPS module unit 50 is located in a mobile device (smartphone) 300. The roles of the remaining function blocks of the third embodiment may be regarded as being the same as those of the first embodiment. Therefore, in FIG. 3, the same reference numerals are used to designate the components having the same functions as those of FIG. 1, and thus a detailed description thereof will be omitted.

The advantage of the third embodiment according to the present invention is that a less expensive optical link quality measuring device can be implemented if the measuring device is implemented in the form of an application by utilizing a mobile device (smartphone), which is widely used at the present time. Further, if the output unit 18 of the handheld optical link quality measuring device 100 is implemented using the screen of the mobile device, a separate screen may be omitted, thus enabling the measuring device to be implemented more cheaply.

In FIG. 3, the short-range communication unit 28 of the handheld optical link quality measuring device 100 supports short-range communication protocols, such as WiFi, Bluetooth, Near-Field Communication (NFC), Ultra-wideband (UWB), and Universal Serial Bus (USB) protocols, thus facilitating the setup of connection to the mobile device (smartphone) 300.

Meanwhile, in FIG. 3, the handheld optical link quality measuring device 100 and the mobile device 300 are shown as being separate components. Here, since the mobile device 300 is also a handheld device that can be carried, the handheld optical link quality measuring device 100 and the mobile device 300 may be collectively called a 'handheld optical link quality measuring device'.

Hereinafter, the stage-based operations of the separated-type optical link quality measuring device based on mobile device interworking according to the third embodiment of the present invention will be described in detail with reference to FIGS. 4 and 5.

Figure 4:
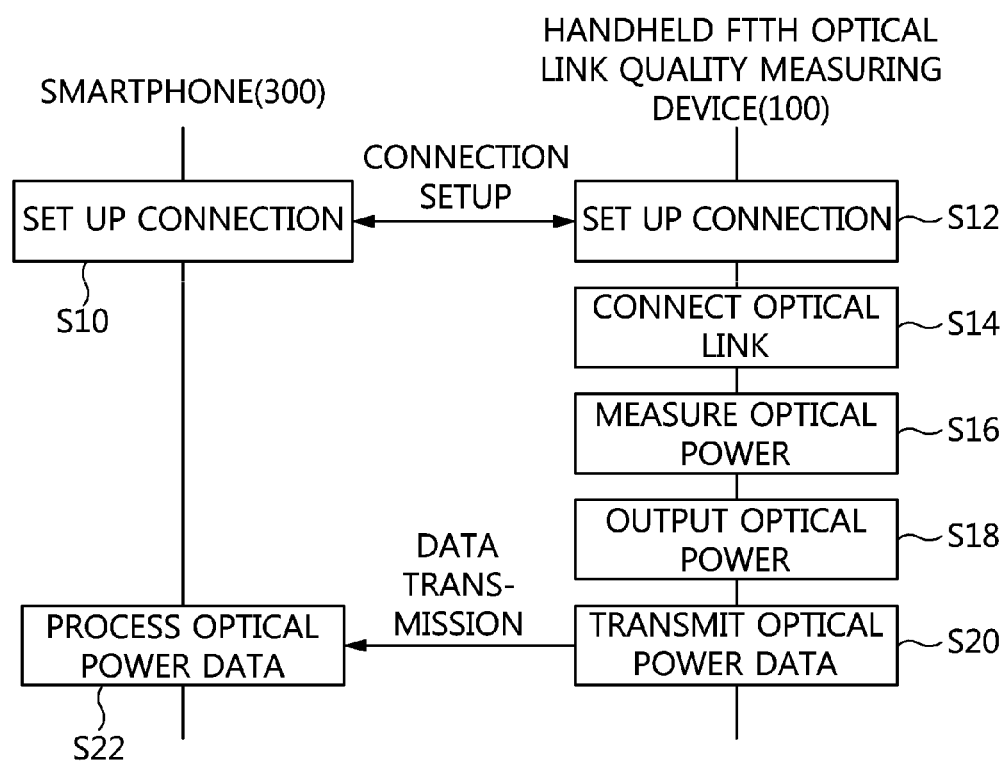
FIG. 4 is a flowchart showing the optical power measurement procedure performed by the device shown in FIG. 3.

FIG. 4 illustrates the operation of an optical power measurement procedure as the first stage of a total of two stages.

The connection of a communication channel between the short-range communication unit 48 of the mobile device 300 and the short-range communication unit 28 of the separated-type optical link quality measuring device 100 based on mobile device interworking according to the third embodiment is set up, thus enabling the mobile device 300 to be connected to the measuring device 100 at steps S10 and S12.

Thereafter, an optical connector for the optical link that is desired to be measured is connected to the optical signal input port 10 of the separated-type optical link quality measuring device 100 based on mobile device interworking according to the third embodiment of the present invention at step S14.

The optical signal received through the optical signal input port 10 is transferred to the optical power measurement unit 12, and the optical power measurement unit 12 measures the optical power (wavelength and strength) at step S16.

Information about the measured wavelength and strength is displayed on the output unit 18 via the control unit 20 at step S18. Here, the measured wavelength and strength information may be collectively designated as 'optical power data'.

Thereafter, the optical power data measured in this way is transferred from the control unit 20 to a quality measurement application unit 46 while passing through the short-range communication unit 28 of the optical link quality measuring device and the short-range communication unit 48 and the control unit 44 of the mobile device 300.

Accordingly, the optical power data is stored in the quality measurement application unit 46 of the mobile device 300, and is displayed on the output unit 42 of the corresponding mobile device 300.

Figure 5:
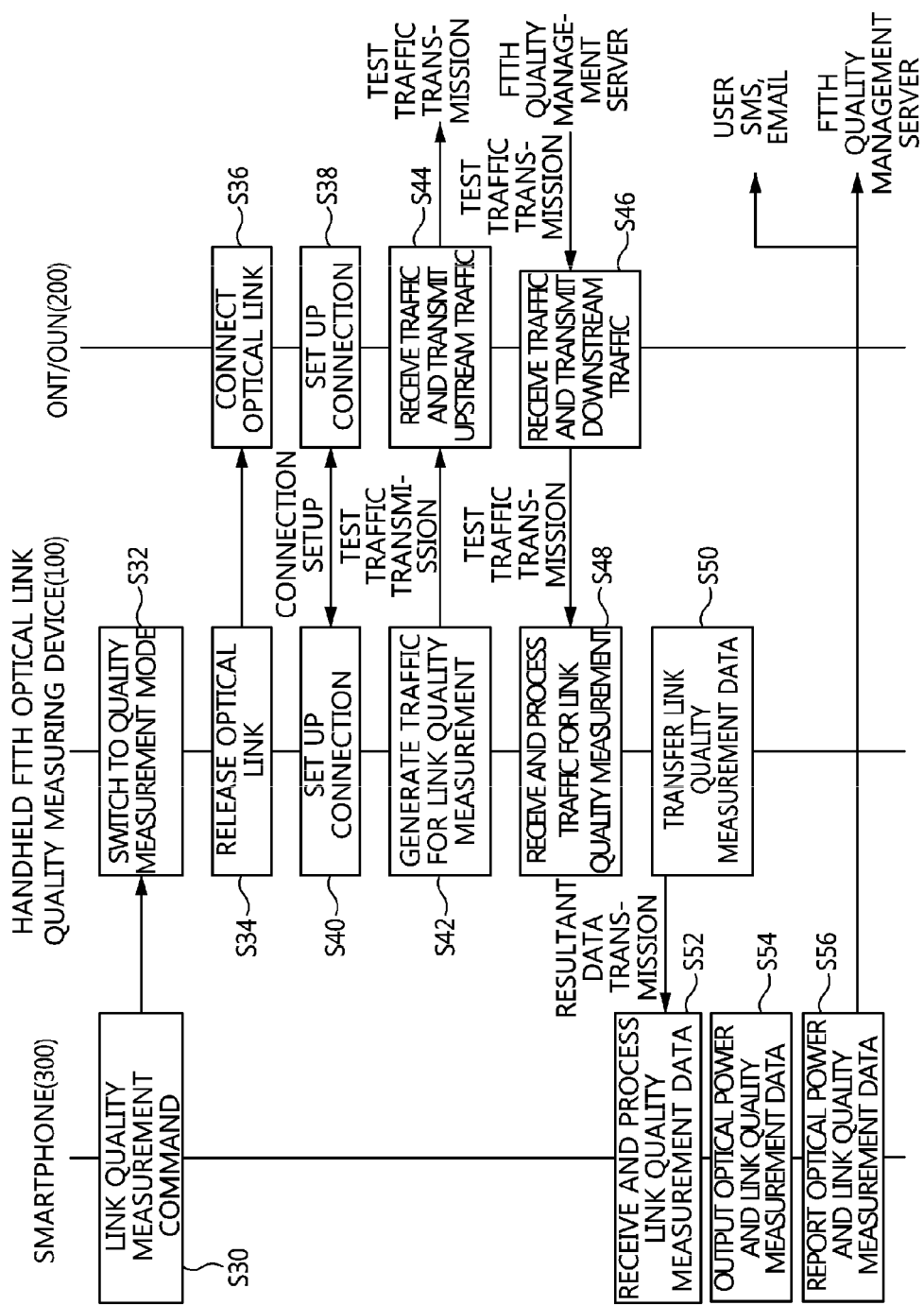
FIG. 5 is a flowchart showing an optical link quality measurement procedure performed by the device shown in FIG. 3.

FIG. 5 is a flowchart showing the optical link measurement procedure, which is the second stage of the operations performed by the device shown in FIG. 3.

When the resultant values obtained in the first stage (i.e. optical power data) have been successfully stored in the quality measurement application unit 46 of the mobile device 300, the link quality measurement command corresponding to the second stage is delivered to the control unit 20 of the separated-type optical link quality measuring device 100 based on mobile device interworking according to the third embodiment at step S30.

The mode of the control unit 20 that has received the link quality measurement command is switched to a quality measurement mode at step S32.

Further, the separated-type optical link quality measuring device 100 based on mobile device interworking according to the third embodiment notifies the user to release the optical connector from the optical signal input port 10 of the measuring device 100 and to connect the optical connector to the optical signal input port 30 of the ONT 200. The method of providing notification to the user may be performed using both a method of displaying such a notification on the output unit 18 of the separated-type optical link quality measuring device 100 based on mobile device interworking according to the third embodiment and a method of providing notification to the user using a sound such as an alarm.

Accordingly, the user releases the optical connector from the optical signal input port 10 at step S34, and connects the optical connector to the optical signal input port 30 of the ONT 200 at step S36.

Thereafter, the Ethernet communication unit 16 of the separated-type optical link quality measuring device 100 based on mobile device interworking according to the third embodiment is connected to the Ethernet communication unit 36 of the ONT 200 through a cable, thus enabling data to be transferred between the quality measuring device 100 and the ONT 200 at steps S38 and S40.

When the Ethernet connection between the quality measuring device 100 and the ONT 200 has been checked, the control unit 20 of the separated-type optical link quality measuring device 100 based on mobile device interworking initiates a process for measuring the bandwidth and latency performance of the optical link. The upstream/downstream bandwidth and the latency performance may be measured while upstream and downstream test traffic is exchanged with a previously configured FTTH quality management server in a central office at steps S42 to S48.

The link quality measurement data obtained via the transmission of the test traffic is transmitted from the control unit 20 to the quality measurement application unit 46 of the mobile device 300 at step S50.

Accordingly, the quality measurement application unit 46 of the mobile device 300 collects the wavelength information and optical signal strength information, which are measurement values in the first stage, the upstream/downstream bandwidth information and latency performance information, which are measurement values in the second stage, and location information, which is obtained using the GPS module unit 50, and displays the collected information on the output unit 42 using a Graphical User Interface (GUI) at steps S52 and S54.

Thereafter, the measurement data values may be transmitted to the user via SMS or email through the long-range communication unit 40 of the mobile device 300 while being stored and managed in the FTTH quality management server at step S56. Here, the long-range communication unit 40 may support various communication protocols such as Code Division Multiple Access (CDMA), Wideband CDMA (WCDMA), High Speed Packet Access (HSPA), Wibro, and Long Term Evolution (LTE) protocols.

Figure 6:
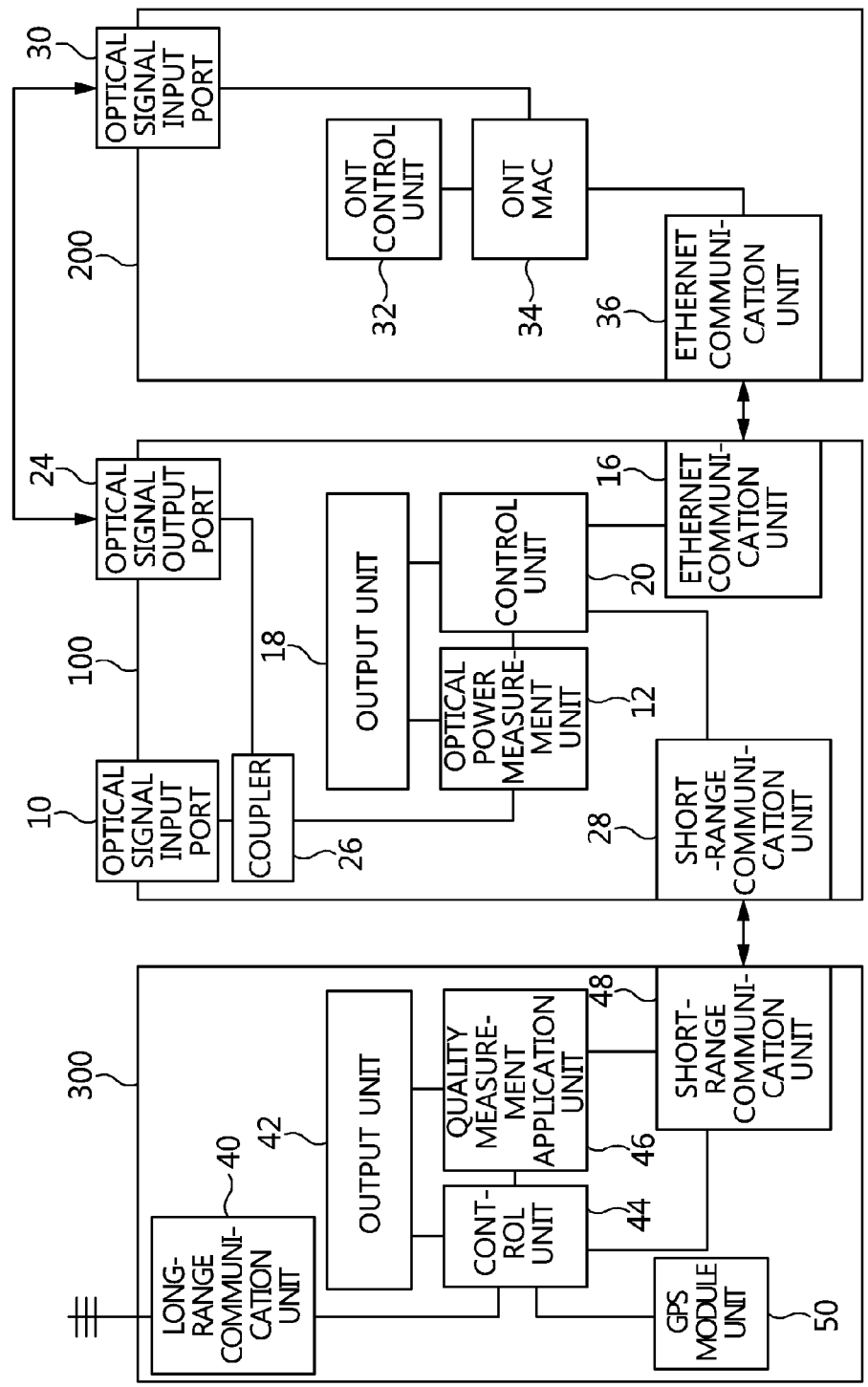
FIG. 6 is a configuration diagram showing a handheld device for measuring the quality of an optical link according to a fourth embodiment of the present invention.

FIG. 6 is a configuration diagram showing a handheld device for measuring the quality of an optical link according to a fourth embodiment of the present invention. That is, FIG. 6 may be regarded as a diagram for describing the structure of an integrated-type optical link quality measuring device based on mobile device interworking according to the present invention.

The handheld optical link quality measuring device 100 according to the fourth embodiment of the present invention is advantageous in that the respective measurement procedures may be performed simultaneously, rather than being performed in two stages, which is the disadvantage of the above-described handheld optical link quality measuring device according to the third embodiment.

Compared to the handheld optical link quality measuring device according to the third embodiment, the handheld optical link quality measuring device 100 according to the fourth embodiment of the present invention further includes an optical signal output port 24 and a coupler 26. The same reference numerals are used to designate components having the same functions as those of FIG. 3, and thus a detailed description thereof will be omitted.

The handheld optical link quality measuring device 100 according to the fourth embodiment of the present invention branches an optical signal into two directions using a 1:2 coupler 26. That is, the optical signal received by an optical signal input port 10 is separated into parts for an optical power measurement unit 12 and for the optical signal output port 24 through the coupler 26. In this case, the measuring device is designed such that only a small amount of optical signal (e.g. about 5% or less of the input optical signal) is distributed to the optical power measurement unit 12.

Further, the optical signal output port 24 of the handheld optical link quality measuring device 100 according to the fourth embodiment is connected to the optical signal input port 30 of the ONT 200 through an optical fiber connector, thus enabling an optical signal to be applied to the ONT 200.

The operating scheme of the above-described handheld optical link quality measuring device 100 according to the fourth embodiment is characterized in that operations that were performed in two stages in the above-described third embodiment are performed simultaneously. In other words, the handheld optical link quality measuring device 100 according to the fourth embodiment may simultaneously perform the procedure for measuring the wavelength and strength of an optical signal and the procedure for measuring the bandwidth and latency of an optical link. The remaining operating schemes of the fourth embodiment are identical to those of the third embodiment.

Meanwhile, in FIG. 6, the handheld optical link quality measuring device 100 and the mobile device 300 are shown as separate components. Here, since the mobile device 300 is also a handheld device, the handheld optical link quality measuring device 100 and the mobile device 300 may be collectively called a 'handheld optical link quality measuring device'.

Figure 7:
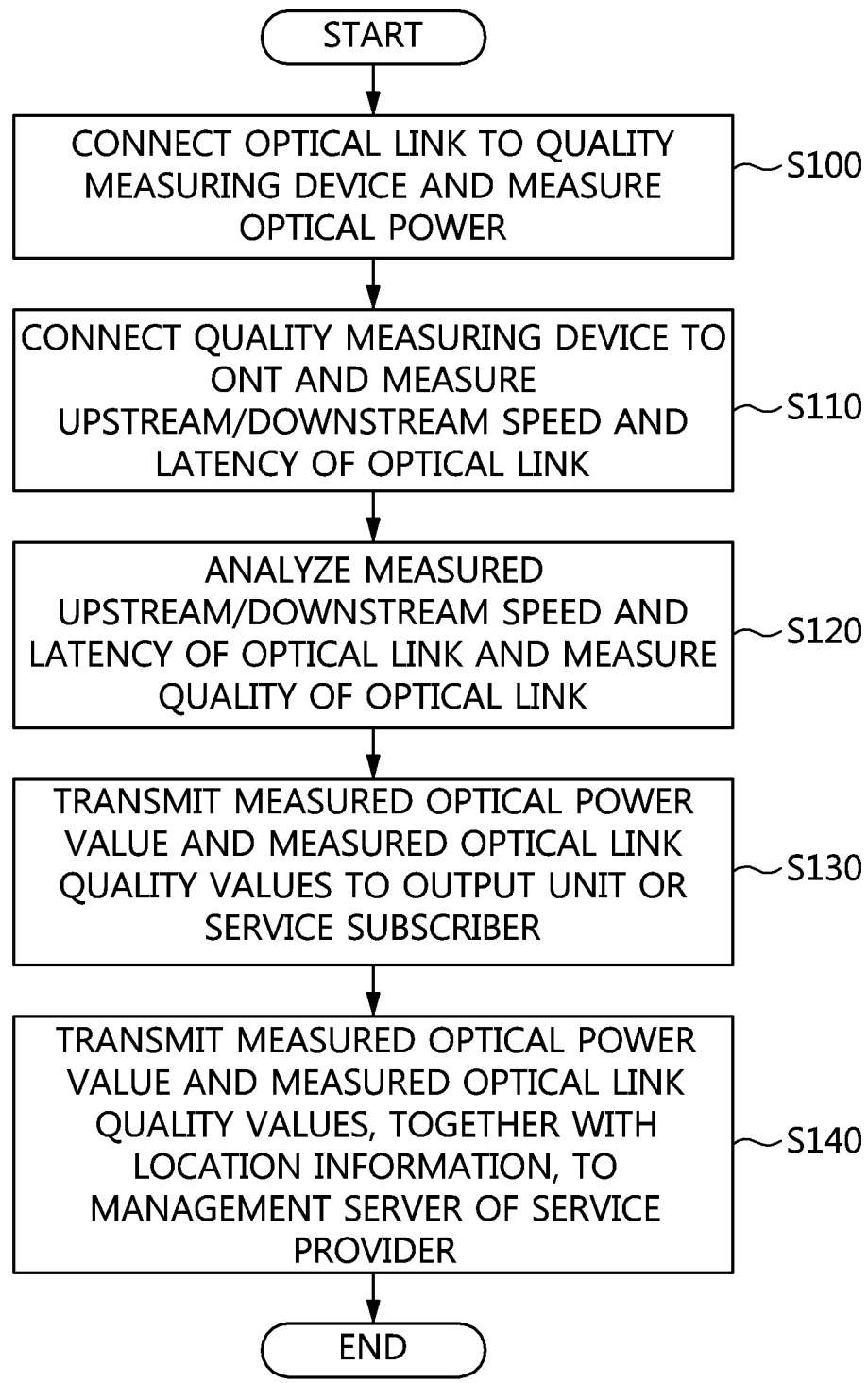
FIG. 7 is a flowchart showing a method for measuring the quality of an optical link according to an embodiment of the present invention.

Referring to the operations of the handheld optical link quality measuring device according to the first to fourth embodiments of the present invention, it can be seen that the following common operation is performed. FIG. 7 is a flowchart showing a method for measuring the quality of an optical link according to an embodiment of the present invention.

First, an optical link is connected to the quality measuring device 100, and then optical power (wavelength and strength) is measured at step S100.

Then, the quality measuring device 100 is connected to the ONT 200, and the upstream/downstream speed (bandwidth) and latency of the optical link is measured at step S110. Here, the measured upstream/downstream speed and latency of the optical link may be regarded as optical link quality information.

Further, the measured optical power (wavelength and strength) and the measured optical link quality information are analyzed, and thus the performance of the optical link is determined at step S120.

A performance report for the optical link is transmitted to the output unit 18 of the quality measuring device 100 or to a service subscriber via SMS or email, thus providing the quality information to the subscriber at step S130.

Thereafter, the optical link quality information and the location information are transmitted to the management server of a service provider at step S140.

Figure 8:
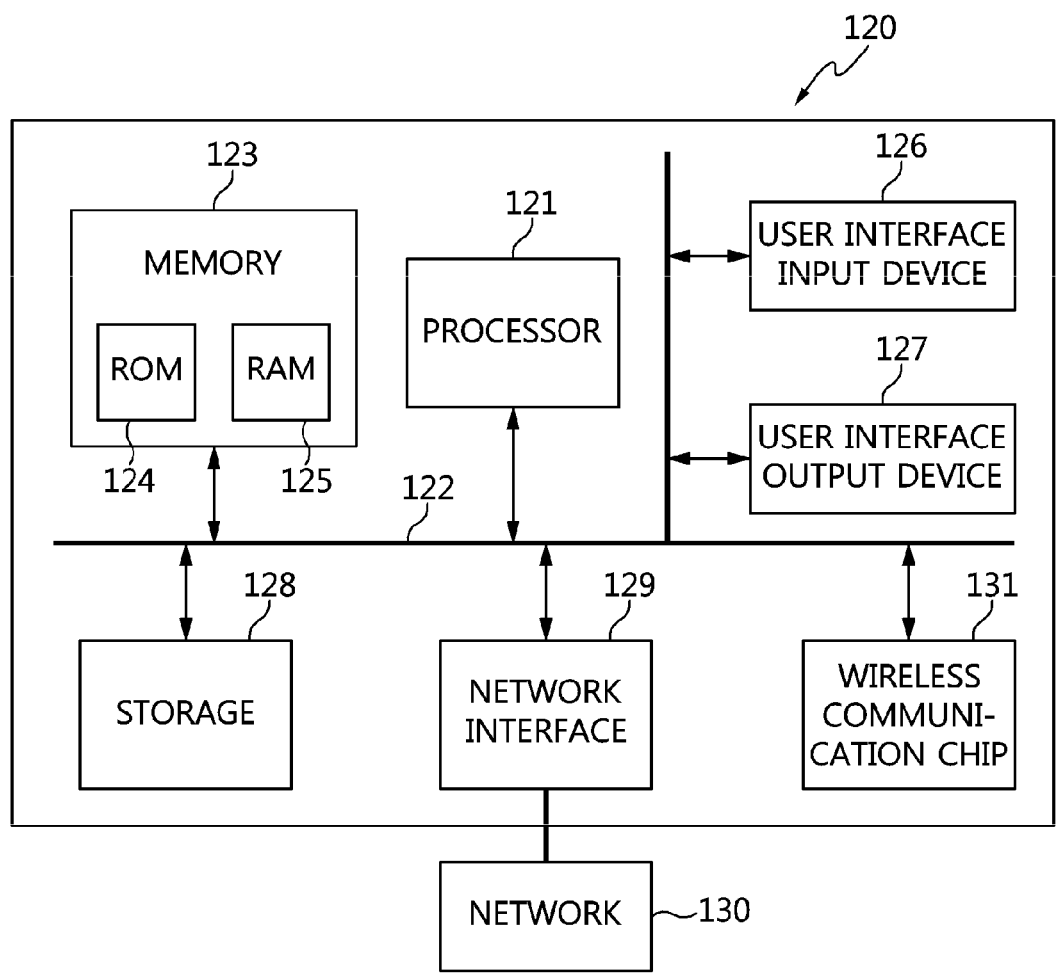
FIG. 8 is a diagram showing a computer system in which the embodiment of the present invention is implemented.

Meanwhile, the above-described embodiment of the present invention may be implemented in a portable computer system. As shown in FIG. 8, a portable computer system 120 may include one or more processors 121, memory 123, a user interface input device 126, a user interface output device 127, and storage 128, which communicate with each other through a bus 122. The portable computer system 120 may further include one or more network interfaces 129 connected to a network 130. Each processor 121 may be either a Central Processing Unit (CPU) or a semiconductor device for executing processing instructions stored in the memory 123 or the storage 128. Each of the memory 123 and the storage 128 may be any of various types of volatile or non-volatile storage media. For example, the memory 123 may include Read Only Memory (ROM) 124 or Random Access Memory (RAM) 125.

Further, when the portable computer system 120 is implemented in a small-sized computing device, in preparation for the Internet of Things (IoT) era, if an Ethernet cable is connected to the computing device, the computing device may function as a wireless sharer, so that a mobile device may be coupled in a wireless manner to a gateway to perform encryption/decryption functions. Therefore, the portable computer system 120 may further include a wireless communication chip (WiFi chip) 131.

Therefore, the embodiment of the present invention may be implemented as a non-temporary computer-readable storage medium in which a computer-implemented method or computer-executable instructions are recorded. When the computer-readable instructions are executed by a processor, the instructions may perform the method according to at least one aspect of the present invention.

In accordance with the present invention having the above configuration, there is an advantage in that the inconvenience of requiring a user to carry multiple devices and an increase in economic burden, which are the problems with the conventional technology, may be overcome, and in that the reliability, both of ascertaining that an engineer actually travelled to the worksite and of the quality measurement values of the corresponding optical link, may be improved based on the GPS-based location information.

Further, the present invention includes both an optical power meter function, which enables the signal strength of an optical link in an FTTH network to be measured, and a service quality measurement function, which enables service quality to be measured, thus efficiently providing the service of a Passive Optical Network (PON) and more efficiently managing the optical link of the PON.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A handheld device for measuring a quality of an optical link, comprising:
    an optical signal input port for receiving an optical signal;
    an optical power measurement unit for measuring a power of the optical signal;
    an output unit for outputting one or more of a measured power value of the optical signal and results of quality measurement of an optical link, based on interworking with an optical network terminal; and
    a control unit for storing the measured power value of the optical signal and performing a process for quality measurement of the optical link.

2. The handheld device of claim 1, wherein the optical signal input port is connected to an optical fiber connector of an optical link that is desired to be measured.

3. The handheld device of claim 1, wherein the measured power value of the optical signal includes a wavelength and a strength of the corresponding optical signal.

4. The handheld device of claim 1, wherein the control unit is configured to, when the optical network terminal is initialized and the control unit is connected to the optical network terminal, initiate the process for quality measurement of the optical link.

5. The handheld device of claim 4, wherein the control unit obtains resultant values for upstream/downstream bandwidth and latency of the optical link as the results of quality measurement of the optical link.

6. The handheld device of claim 5, further comprising a Global Positioning System (GPS) module unit for acquiring location information of the handheld device for measuring the quality of the optical link,
    wherein the location information is stored, together with the measured power value of the optical signal and the results of quality measurement of the optical link, in the control unit.

7. The handheld device of claim 6, further comprising a long-range communication unit,
    wherein the control unit transmits the stored power value of the optical signal and the results of quality management of the optical link to a service subscriber or a quality management server through the long-range communication unit.

8. The handheld device of claim 1, further comprising:
    an optical signal output port for providing the optical signal to the optical network terminal; and
    a coupler for branching the optical signal, input to the optical signal input port, into the optical power measurement unit and the optical signal output port.

9. A handheld device for measuring a quality of an optical link, comprising:
    an optical signal input port for receiving an optical signal;
    an optical power measurement unit for measuring a power of the optical signal; and
    a control unit for transmitting a measured power value of the optical signal to a mobile device, and transmitting results of quality measurement of an optical link based on interworking with the optical network terminal to the mobile device.

10. The handheld device of claim 9, wherein the control unit directs an optical connector to be released from the optical signal input port and to be connected to the optical network terminal in compliance with a quality measurement command from the mobile device.

11. The handheld device of claim 10, wherein the control unit is configured to, when the optical connector is connected to the optical network terminal and then the control unit is connected to the optical network terminal, initiate a process for quality measurement of the optical link.

12. The handheld device of claim 11, wherein the control unit obtains resultant values for upstream/downstream bandwidth and latency of the optical link as the results of quality measurement of the optical link.

13. The handheld device of claim 9, wherein the mobile device displays the power value of the received optical signal and the results of quality measurement of the optical link on a screen.

14. The handheld device of claim 13, wherein the mobile device displays location information, together with the power value of the received optical signal and the results of quality measurement of the optical link, on the screen.

15. The handheld device of claim 13, wherein the mobile device transmits the power value of the received optical signal and the results of quality measurement of the optical link to a service subscriber or a quality management server.

16. The handheld device of claim 9, further comprising:
   an optical signal output port for providing the optical signal to the optical network terminal; and
   a coupler for branching the optical signal, input to the optical signal input port, into the optical power measurement unit and the optical signal output port.

17. A method for measuring a quality of an optical link, comprising:
   measuring, by a handheld optical link quality measuring device, a power of an optical signal, via a connection to an optical link that is desired to be measured;
   measuring, by the handheld optical link quality measuring device, upstream/downstream speed and latency of the optical link, via a connection to an optical network terminal; and
   analyzing, by the handheld optical link quality measuring device, the upstream/downstream speed and latency of the optical link, thus determining a performance of the optical link.

18. The method of claim 17, further comprising, after determining the performance of the optical link:
   displaying, by the handheld optical link quality measuring device, the measured power value of the optical signal and the results of quality measurement of the optical link on a screen.

19. The method of claim 17, further comprising, after determining the performance of the optical link:
   transmitting, by the handheld optical link quality measuring device, the measured power value of the optical signal and the results of quality measurement of the optical link to a service subscriber.

20. The method of claim 17, further comprising, after determining the performance of the optical link:
   transmitting, by the handheld optical link quality measuring device, the measured power value of the optical signal and the results of quality measurement of the optical link, together with location information, to a management server of a service provider.

* * * * *